United States Patent
Arnold et al.

(10) Patent No.: US 6,547,208 B2
(45) Date of Patent: Apr. 15, 2003

(54) MOTOR MOUNTING ASSEMBLY

(75) Inventors: Paul E Arnold, Reese, MI (US); William Henry Wittig, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 40 days.

(21) Appl. No.: 09/748,480

(22) Filed: Dec. 27, 2000

(65) Prior Publication Data

US 2002/0079420 A1 Jun. 27, 2002

(51) Int. Cl.⁷ .............................................. F16M 11/00
(52) U.S. Cl. ........................... 248/672; 310/42; 310/89; 310/91; 310/326
(58) Field of Search ................................ 248/672, 640; 310/85, 88, 89, 91, 42, 326, 327, 344

(56) References Cited

U.S. PATENT DOCUMENTS

| | | | | |
|---|---|---|---|---|
| 2,748,302 A | * | 5/1956 | Boeckel | 200/302.1 |
| 3,348,082 A | * | 10/1967 | Martin | 310/85 |
| 3,535,564 A | * | 10/1970 | Anastasio et al. | 310/10 |
| 4,768,931 A | * | 9/1988 | Iwai et al. | 310/87 |
| 4,853,576 A | * | 8/1989 | Mayumi et al. | 29/597 |
| 4,927,608 A | * | 5/1990 | Worner et al. | 422/179 |
| 5,134,330 A | * | 7/1992 | Haas et al. | 29/596 |
| 5,237,231 A | * | 8/1993 | Blaettner et al. | 310/239 |
| 6,124,656 A | * | 9/2000 | Jensen | 310/42 |
| 6,241,055 B1 | * | 6/2001 | Daudi | 188/218 XL |

FOREIGN PATENT DOCUMENTS

WO   WO 00/50274   * 8/2000

* cited by examiner

Primary Examiner—Korie Chan
(74) Attorney, Agent, or Firm—Edmund P. Anderson

(57) ABSTRACT

A motor mounting assembly (30) for attaching a motor (32) to a housing (34) is presented. The mounting assembly (30) includes a pair of flanges (36, 38), one on the housing (34) and one on the motor (32). Each flange (36, 38) has a recess (54, 66) extending around its circumference. A hollow cover (44) is inserted over the flanges (36, 38) and crimped into the recesses (54, 66) to fasten the cover (44) and the motor (32) to the housing (34). The cover (44) includes inner and outer shells (84, 86) separated by a viscoelastic adhesive (88). A resilient damper (40) is sandwiched between the housing flange (38) and the motor flange (36).

17 Claims, 5 Drawing Sheets

MOTOR MOUNTING ASSEMBLY

TECHNICAL FIELD

The present invention relates to the mounting of machinery. More particularly, the present invention relates to a method and apparatus for mounting a motor to a mechanical system.

BACKGROUND

Electrical motors are used to provide power to mechanical systems. For example, electrical motors may be used in power steering systems for assisting a driver to steer an automobile. Referring to Prior Art FIG. 1, a typical mounting assembly for mounting a motor to a mechanical system is shown generally at 10.

When a motor 12 is mounted to a housing 14 of a mechanical system (not shown), a motor flange 16 on the motor 12 is typically attached by bolts 18 to a housing flange 20, which is formed on housing 14. The motor 12 is isolated from vibration generated in the housing 14, usually by mounting grommets or shock mounts 22 in between the motor flange 16 and the housing flange 20.

Where the motor 12 is to operate in harsh environments, the motor 12 and the mechanical system should be protected from the environment. To help prevent contaminants from entering the motor 12 or the mechanical system, a motor cover 24, or "can", is placed over the motor 12 and is attached by bolts 26 to the motor flange 16. In addition, an elastomeric seal 28 is positioned around an outside diameter of the motor flange 16 for interfacing with an inside diameter of the motor cover 24. The elastomeric seal 28 prevents contaminants from entering the space between the motor flange 16 and the motor cover 24.

The use of bolts 18 and mounting grommets 22 for mounting the motor 12 to housing 14 adds to the cost required for manufacturing the assembly 10. For example, the use of bolts 18 requires that the motor flange 16 and the housing flange 20 are large enough to accept the bolts 18 and to allow sufficient space for a technician to insert and tighten the bolts 18. Increasing the size of the flanges 16 and 20 to accommodate the bolts 18 or to make the bolts 18 accessible increases the material cost for the assembly 10 and the space required for the assembly 10. In addition, the housing flange 20 must either be threaded (as shown) or a nut must be applied to the bolts 18, both of which require an additional step in the manufacture of assembly 10. In sum, the use of bolts 18 and mounting grommets 22 for mounting the motor 12 to the housing 14 of a mechanical system results in additional time and material costs.

SUMMARY

In an exemplary embodiment, a motor mounting assembly for mounting a motor to a housing includes a housing flange disposed on the housing, with the housing flange having a first recess formed therein. A motor flange is disposed on the motor, and the motor flange is secured to the housing flange. A cover surrounds the motor and the motor flange, and the cover is crimped into the first recess for securing the cover to the housing flange.

DESCRIPTION OF A PREFERRED EMBODIMENT

Figure 2:
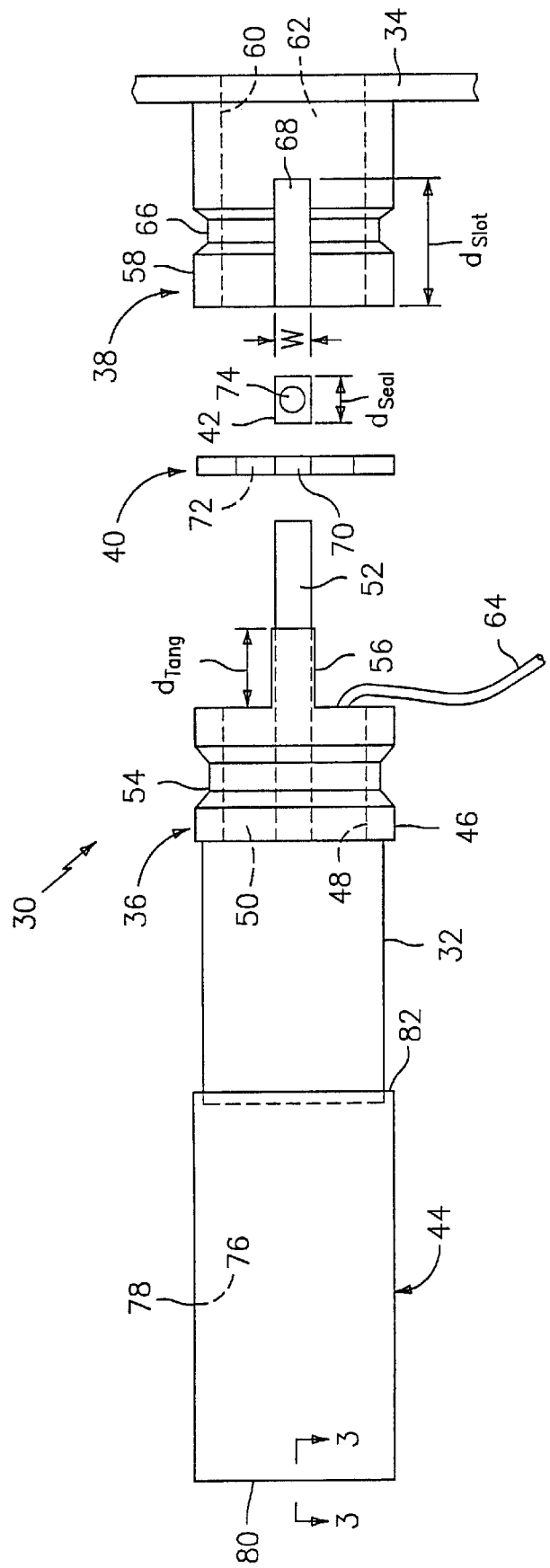
FIG. 2 is an exploded side view of a motor mounting assembly.

Referring to FIG. 2, a motor mounting assembly is generally shown at 30. Motor mounting assembly 30 secures a motor 32 to a housing 34 and provides protection to the motor 32 from the environment. The motor mounting assembly 30 includes a motor flange 36, a housing flange 38, elastomeric seal 42, and a cover 44. Motor mounting assembly 30 also includes an elastomeric damper 40 to isolate the motor 32 from vibration induced by a mechanical system (not shown) to which motor 32 is attached. Elastomeric damper 40 is optional, and may be removed from motor mounting assembly 30 in a benign vibration environment.

Motor flange 36 is a substantially cylindrical structure fixed to motor 32. Motor flange 36 has an outside surface 46 and a substantially concentric inside surface 48, which forms an aperture 50 for receiving a motor shaft 52 and a power supply wire 64 for motor 32. Formed in the outside surface 46, and extending around the circumference of the motor flange 36, is a recess 54. Disposed on the motor flange 36 is a tang 56, which extends in a direction substantially parallel to the motor shaft 52.

Housing flange 38 is a substantially cylindrical structure disposed on housing 34. Housing flange 38 has an outside surface 58 and a substantially concentric inside surface 60, which forms an aperture 62 for receiving motor shaft 52 and power supply wire 64. A recess 66 is formed in the outside surface 58, and extends around the circumference of the housing flange 38. Also formed in the housing flange 38 is a slot 68 configured to receive tang 56 and elastomeric seal 42. Slot 68 has a width "w" approximately equal to the width "w" of both the elastomeric seal 42 and the tang 56. Slot 68 has a depth "$d_{slot}$", which is approximately equal to the sum of the depths of elastomeric seal 42, "$d_{seal}$", and tang 56, "$d_{tang}$".

Elastomeric damper 40 is a ring-shaped structure formed from an elastomeric material having a compliance that provides proper frequency vs. transmission characteristics for isolating motor 32 from the vibration of housing 34. An example of this type of material would be generic rubber with compliance and loss factor properties chosen depending on the mass of motor 32 and frequency to be isolated. The damper 40 has a slot 70 formed therein. Slot 70 is sized to provide clearance for the tang 56. A hole 72 formed through the central portion of elastomeric damper 40 receives motor shaft 52 and wire 64 of motor 32.

Elastomeric seal 42 is a parallelepipedic structure formed from elastomeric material. A hole 74 extends through a central portion of elastomeric seal 42 for receiving wire 64.

Cover 44 is a hollow, thin-walled, cylindrical structure having inside and outside surfaces 76 and 78, a closed end 80, and an open end 82. Cover 44 is sized such that the inside surface 76 fits around the outside surfaces 46 and 58 of motor flange 36 and housing flange 38, respectively. While cover 44, motor flange 36, and housing flange 38 are shown as being substantially cylindrical in shape, it will be recognized that cover 44 and flanges 36 and 38 may be of any geometric shape.

Figure 3:
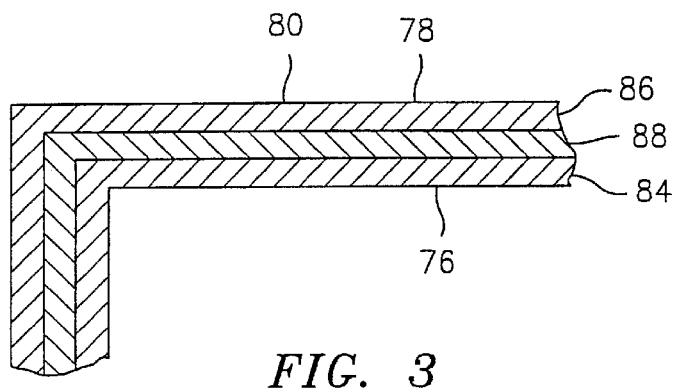
FIG. 3 is a sectional view of the motor cover shown in FIG. 2 along the lines 3–3.

Cover 44 may be made from any material. Preferably, cover 44 is constructed from a damped metal material such as Poly Composites manufactured by MSC Pre-Finish Metals Inc. Referring to FIG. 3, if vibration isolation between the motor 44 and housing 34 is required, a damped metal material is comprised of an inner shell 84 and an outer shell 86. The two shells 84, 86 are separated by a viscoelastic adhesive layer 88.

Figure 4:
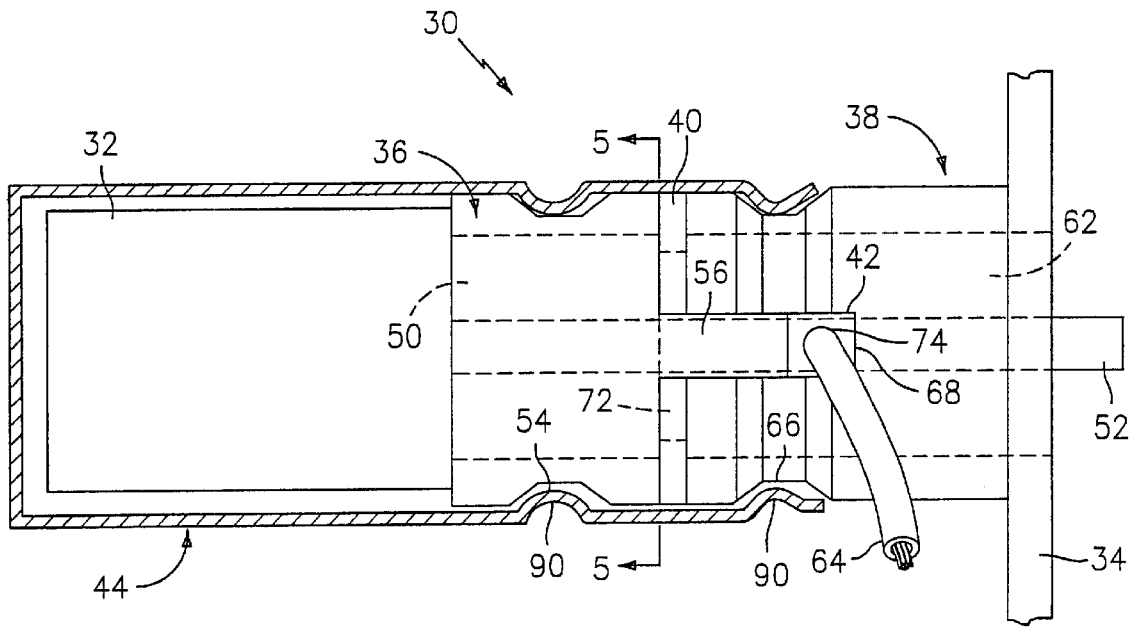
FIG. 4 is a side view of the motor mounting assembly shown in FIG. 2 with the cover shown in section.
Figure 5:
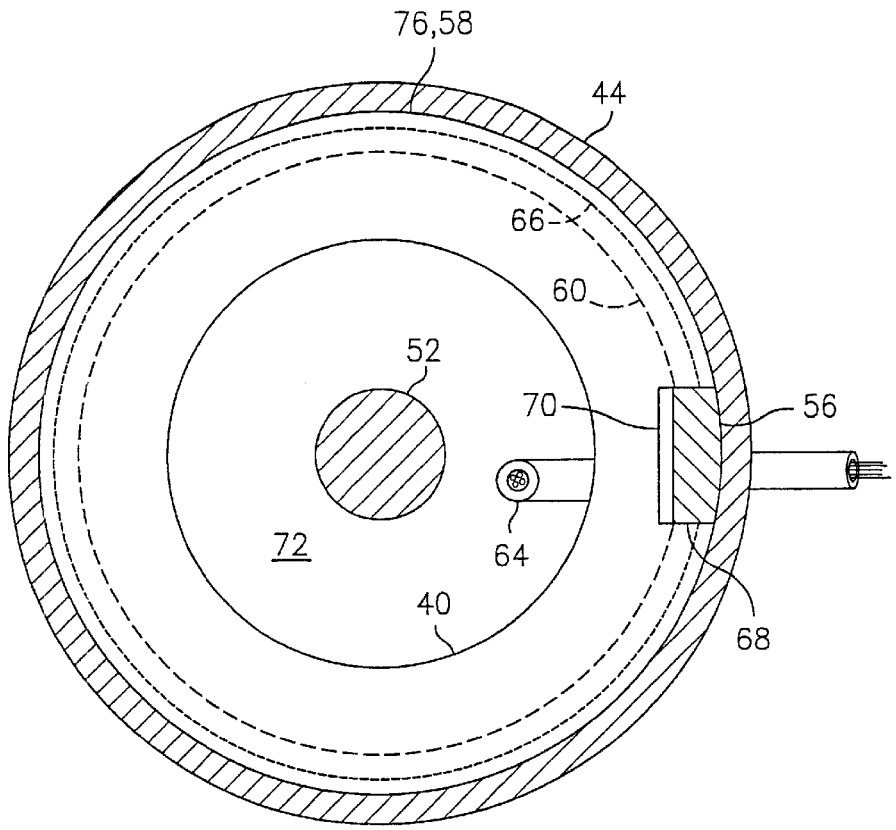
FIG. 5 is a top sectional view of the motor mounting assembly shown in FIG. 4 along the lines 5–5.

Referring now to FIGS. 4 and 5, motor mounting assembly 30 is shown in an assembled state. During assembly, elastomeric damper 40 is placed between motor flange 36 and housing flange 38, with tang 56 extending through slot 70 in elastomeric damper 40. Elastomeric seal 42 and tang 56 are aligned with slot 68 in housing flange 38, and motor flange 36 is forced towards housing flange 38, sandwiching elastomeric damper 40 between motor flange 36 and housing flange 38. Three sides of elastomeric seal 42 are supported within slot 68 by housing flange 38, and a fourth side of elastomeric seal 42 is supported by a free end of tang 56. Tang 56 slightly compresses elastomeric seal 42 to secure elastomeric seal 42 within slot 68 and prevent the ingress of contaminants into aperature 62 of housing flange 38. Wire 64 extends through the hole 74 in elastomeric seal 42 so that wire 64 may be later connected with an external controller (not shown). An interference fit is formed between wire 64 and seal 42, thereby preventing contaminants from entering aperture 62. Motor shaft 52 extends from motor 32, through apertures 50, 62 and 72 formed in flanges 36 and 38 and elastomeric damper 40, respectively, to the mechanical system (not shown). Apertures 50, 62, and 72, are sized to allow the free rotation of motor shaft 52. Tang 56 is captured within slot 68 to prevent the motor mounting assembly 30 from rotating when the motor 32 applies torque to the mechanical system (not shown).

To securely attach motor flange 36 and cover 44 to housing flange 38, cover 44 is fit over motor 32, motor flange 36, elastomeric damper 40 and a portion of housing flange 38. Cover 44 is then crimped such that cover 44 is deformed into the recesses 54 and 66. Crimped portions 90 of the cover 44 form a mechanical fastener for holding the motor 32 and cover 44 to the housing 34. In addition, crimped portions 90 of the cover 44 form a seal for protecting the motor 32 from environmental contaminants.

Crimping of cover 44 can be accomplished by a special machine or a tool (not shown). Alternatively, crimping of cover 44 can be accomplished by a metal band (not shown) placed around housing 44 that can be tightened (such as a screw type hose clamp) to crimp and/or secure the cover 44 within either recess 54 or 56.

Removal of the cover 44 can be facilitated by scoring the cover circumference at the crimped portions 90, allowing the cover 44 to be easily removed. Where a metal band is used to crimp the cover 44, removal of the cover 44 can be facilitated by removing the metal band.

The transmission of vibrational energy from the housing 34 to the motor 32 will be minimized by elastomeric damper 40 and the cover 44. The damper 40 will tend minimize energy transfer from the housing flange 38 to the motor flange 36, while the damped metal material characteristics of the cover 44 will minimize energy transmitted through the cover 44 by the shear energy dissipation characteristics of the adhesive layer 88 (FIG. 3).

Figure 1:
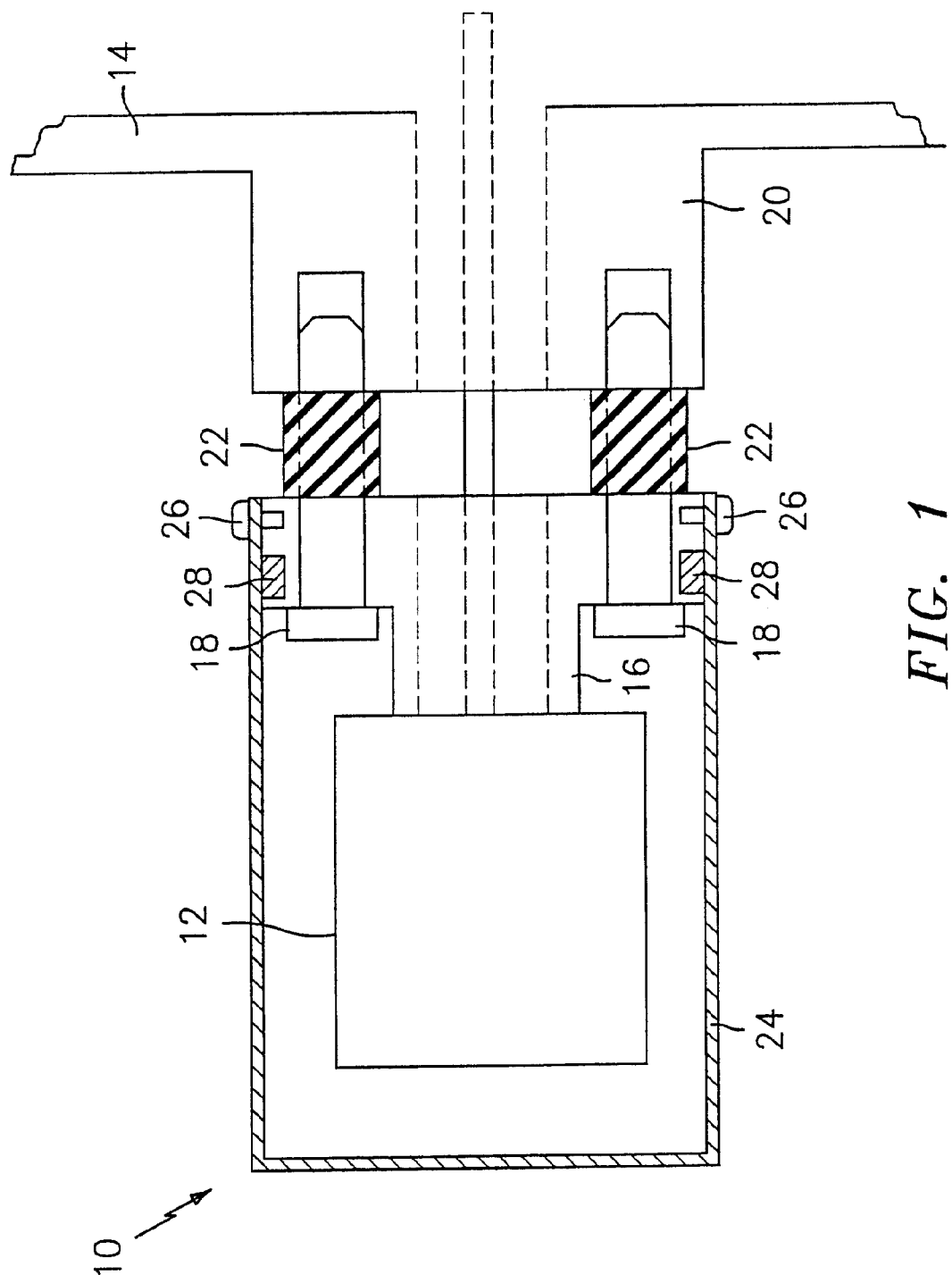
FIG. 1 is a side sectional view of a prior art motor mounting assembly.

The motor mounting assembly 30 eliminates a plurality of bolts (e.g., bolts 18 and 26 in FIG. 1) and a separate environmental seal (e.g., seal 24 in FIG. 1) found in the motor mounting assembly designs of the prior art. Elimination of these parts reduces the cost of the motor mounting assembly 30 below that previously attainable in the prior art. In addition, because the motor flange 36 and housing flange 38 are no longer required to accommodate bolts, the flanges 36 and 38 are smaller than flanges in prior art designs. The reduction in flange size further reduces the cost of the assembly 30 and allows the assembly 30 to be installed in a smaller area than prior art designs.

Figure 6:
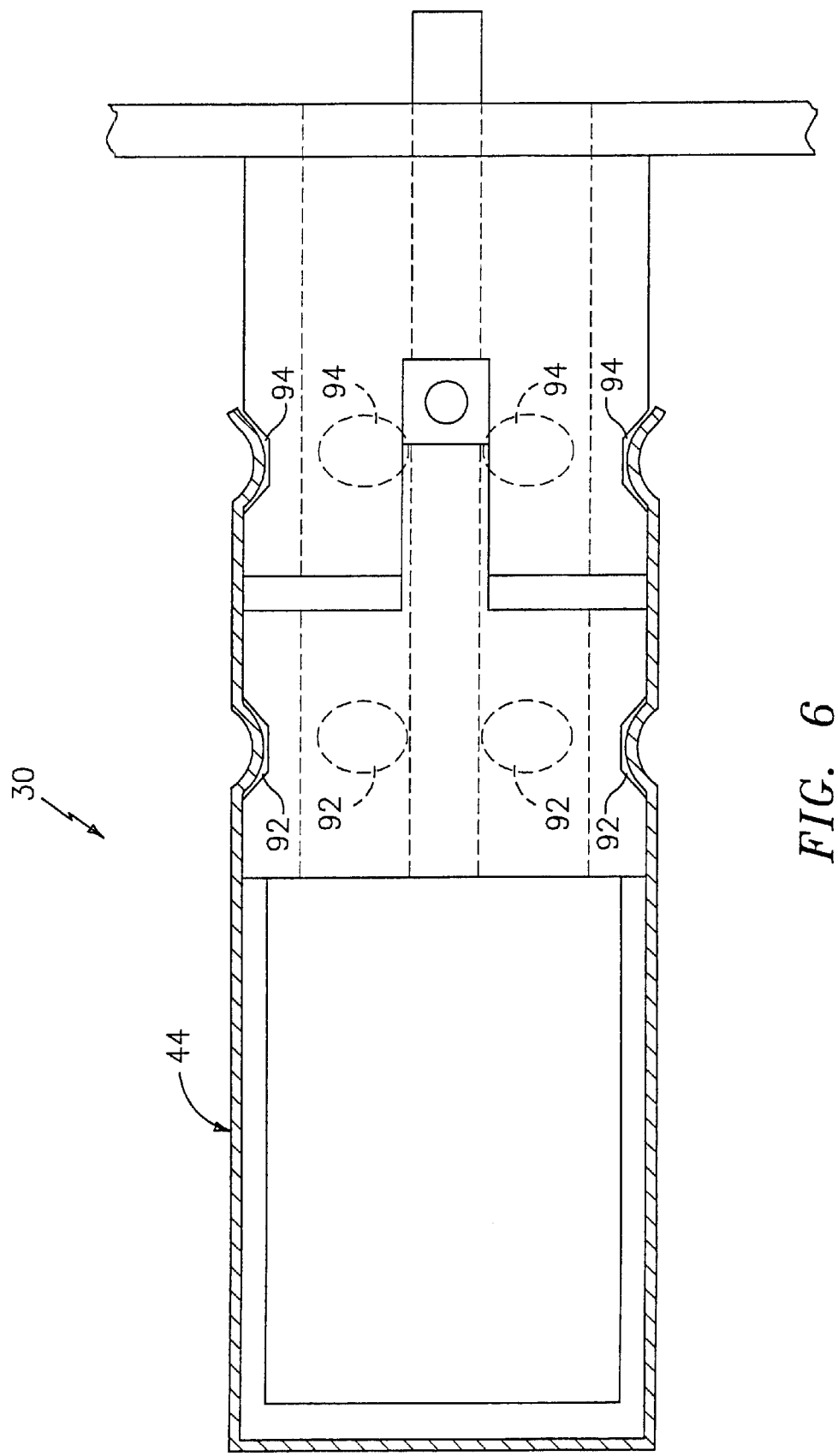
FIG. 6 is a side view of an alternative embodiment of a motor mounting assembly with the cover shown in section.

FIG. 6 shows an alternative embodiment of the motor mounting assembly of FIGS. 2, 4 and 5 where the recesses 54 and 66 of FIGS. 2, 4 and 5 are replaced by a series of recesses 92 that extend around a portion of the circumference of motor flange 36, and a series of recesses 94 that extend around a portion of the circumferences of housing flange 38. In this embodiment, the cover 44 is crimped into the series of recesses 92 and 94. This embodiment may be advantageous if no environmental seal is required.

Figure 7:
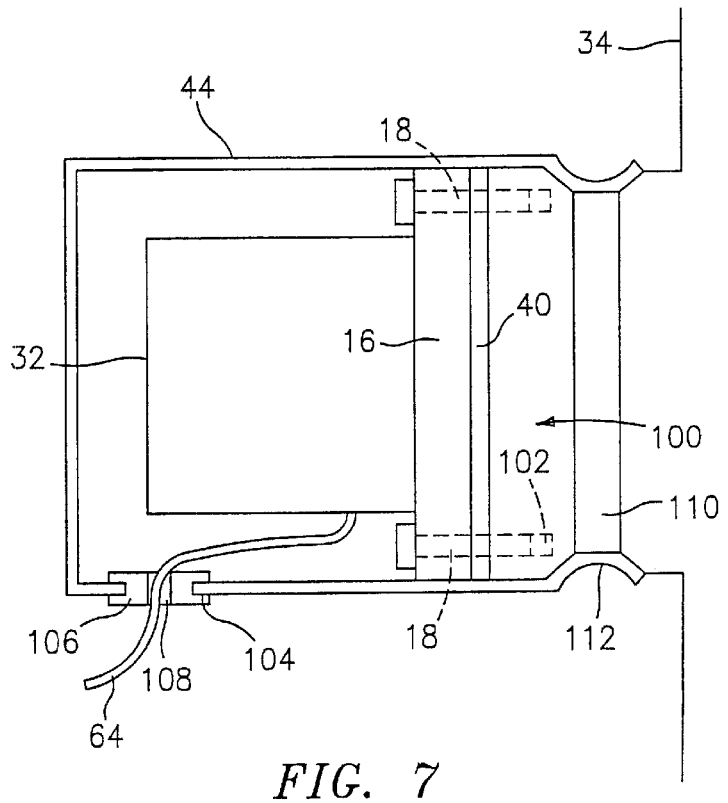
FIG. 7 is a side view of a second alternative embodiment of a motor mounting assembly with the cover shown in section.

Referring to FIG. 7, in another embodiment, motor 32 is fixed to a prior art motor flange 16. A housing flange 100 extends from housing 34, and has threaded holes 102 for threadably accepting bolts 18, which secure motor flange 16 to housing flange 100. Resilient damper 40 is sandwiched between motor flange 16 and housing flange 100. Cover 44 includes an aperture 104 for accepting a grommet 106 in press-fit fashion. Grommet 106 includes a hole 108 disposed therein for accepting wire 64. Cover 44 is secured to housing flange 100 by crimping cover 44 into recess 110, which is formed around the periphery of housing flange 100. Crimped portions 112 of the cover 44 form both the mechanical fastener for holding the cover 44 to the housing 34 and a seal for protecting the motor 32 from environmental contaminants.

As in the previous embodiment, the transmission of vibrational energy from the housing 34 to the motor 32 will be minimized by elastomeric damper 40 and the cover 44. The damper 40 will tend minimize energy transfer from the housing flange 100 to the motor flange 16, while the damped metal material characteristics of the cover 44 will minimize energy transmitted through the cover 44 by the shear energy dissipation characteristics of the adhesive layer 88 (FIG. 3).

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A motor mounting assembly for mounting a motor to a housing, the motor mounting assembly comprising:
   a housing flange disposed on the housing, said housing flange includes a first recess formed therein;
   a motor flange disposed on the motor, said motor flange is secured to said housing flange;
   a cover surrounding the motor and said motor flange, said cover is crimped into said first recess for securing said cover to said housing flange; and
   a tang extending from said motor flange, said tang is received within a slot formed in said housing flange.

2. The motor mounting assembly of claim 1, wherein said cover comprises inner and outer shells, said inner and outer shells are separated by a viscoelastic adhesive.

3. The motor mounting assembly of claim 1 further including:
an elastomeric damper sandwiched between said housing flange and said motor flange.

4. The motor mounting assembly of claim 1 wherein said motor flange includes a second recess formed therein, said cover is crimped into said second recess for securing said motor flange to said housing flange.

5. The motor mounting assembly of claim 1 wherein said first recess extends around the circumference of said housing flange.

6. The motor mounting assembly of claim 1 wherein said first recess extends around a portion of the circumference of said housing flange.

7. The motor mounting assembly of claim 1, further comprising:
an elastomeric seal located within said slot, said elastomeric seal including a hole disposed therein for receiving a wire.

8. The motor mounting assembly of claim 1, further comprising:
an elastomeric damper sandwiched between said housing flange and said motor flange; and
wherein said motor flange includes a second recess formed therein, said cover is crimped into said second recess for securing said motor flange to said housing flange.

9. The motor mounting assembly of claim 8 further comprising:
an elastomeric seal located within said slot, said elastomeric seal including a hole disposed therein for receiving a wire.

10. A motor mounting assembly for mounting a motor to a housing, the motor mounting assembly comprising:
a housing flange disposed on the housing;
a motor flange disposed on the motor, said motor flange is secured to said housing flange; and
a cover surrounding the motor and said motor flange, said cover comprises inner and outer shells, said inner and outer shells are separated by a viscoelastic adhesive.

11. The motor mounting assembly of claim 10, further comprising:
an elastomeric damper sandwiched between said housing flange and said motor flange.

12. The motor mounting assembly of claim 11, wherein said housing flange includes a first recess formed therein, said cover is crimped into said first recess for securing said cover to said housing flange.

13. The motor mounting assembly of claim 12, wherein said motor flange includes a second recess formed therein, said cover is crimped into said second recess for securing said motor flange to said housing flange.

14. A method of mounting a motor and a housing with a motor cover, the method comprising:
inserting a tang extending from a motor flange into a slot disposed in a housing flange;
disposing the cover over the motor and the motor flange; and
crimping the cover onto the housing flange to secure the motor flange to the housing flange.

15. The method of claim 14, wherein said securing the motor flange to the housing flange includes:
crimping the cover onto the motor flange.

16. The method of claim 14, further comprising:
sandwiching an elastomeric damper between the motor flange and the housing flange.

17. The method of claim 14, further comprising:
inserting an elastomeric seal into the slot; and
compressing the elastomeric seal with the tang.

* * * * *